Aug. 18, 1964 W. A. GANGUET ETAL 3,144,744
COTTON HARVESTER
Filed July 3, 1961
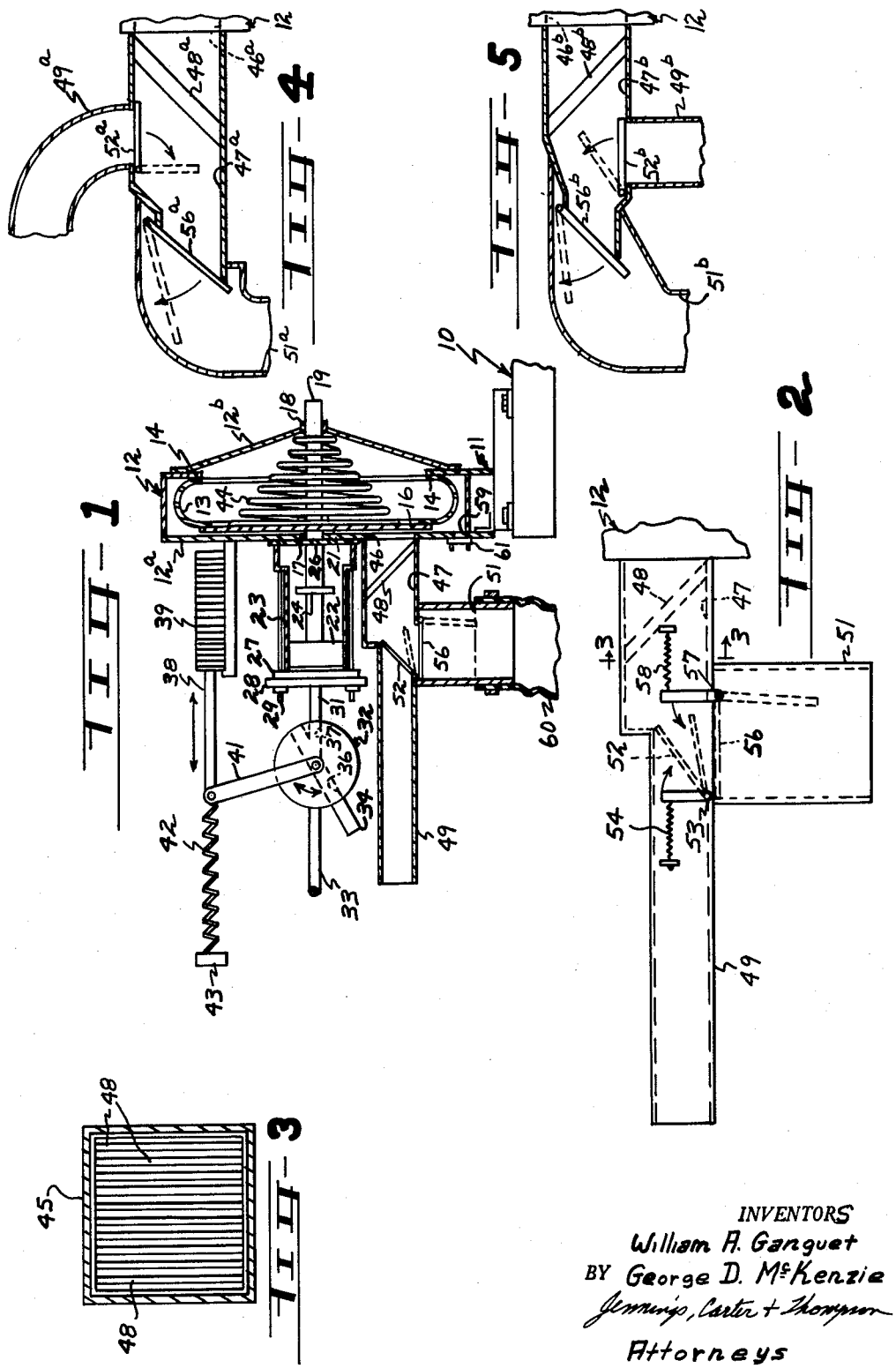
INVENTORS
William A. Ganguet
BY George D. McKenzie
Jennings, Carter + Thompson
Attorneys

United States Patent Office 3,144,744
Patented Aug. 18, 1964

3,144,744
COTTON HARVESTER
William A. Ganguet, Cuba, Ala., and George D. McKenzie, 115 Magnolia Ave., Evergreen, Ala.
Filed July 3, 1961, Ser. No. 121,483
9 Claims. (Cl. 56—31)

This invention relates to a cotton harvester of the pneumatic type and this application discloses an improvement over our co-pending application Serial No. 68,548, now Patent 3,058,282 filed November 10, 1960 and entitled "Cotton Harvester."

An object of our invention is to provide a pneumatic cotton harvester in which the cotton is picked in an improved manner with a minimum pickup of trash, leaves and the like, together with improved means for separating the air from the cotton whereby there is a free flow of the air through the separating means at all times.

Another object of our invention is to provide a cotton harvester of the character designated in which the means for separating the air from the cotton is constructed and arranged whereby it is self-cleaned as the air and cotton engage the same.

A further object of our invention is to provide a cotton harvester of the character designated which shall include improved spring means for returning the diaphragm of the apparatus to its original position after it has been actuated by a fluid pressure operated cylinder, whereby cotton is discharged from the cotton receiving chamber in a uniform manner.

A still further object of our invention is to provide a cotton harvester of the character designated which is simple of construction, economical of manufacture and one which is trouble free in operation due to the fact that the flow of air and cotton through the apparatus is uniform and the means for separating the air from the cotton is maintained in a clean condition at all times without disassembly of the apparatus for cleaning and repair.

Apparatus embodying features of our invention is illustrated in the accompanying drawing, forming a part of this application, in which:

FIG. 1 is a vertical sectional view of the apparatus showing a fragment of the vehicle for carrying the apparatus;

FIG. 2 is an enlarged fragmental view showing the cotton receiving chamber and the manner in which the check valves and partition members are mounted therein;

FIG. 3 is an enlarged view taken generally along the line 3—3 of FIG. 2;

FIG. 4 is a vertical sectional view showing a modified form of our invention; and, FIG. 5 is a vertical sectional view showing a still further modified form of our invention.

Referring now to the drawing for a better understanding of our invention, we show a fragment of a translatable frame 10 which may be in the form of a tractor, truck or the like. Mounted on the translatable frame 10 is a frame 11 which supports a bellows housing 12 having opposed side walls 12$^a$ and 12$^b$. Within the bellows housing 12 is an annular diaphragm 13 which is formed of a suitable flexible material such as rubber or the like. As shown in FIG. 1, the annular diaphragm 13 is generally U-shaped, as viewed in transverse cross section. One edge of the diaphragm 13 is secured by suitable retaining means to the adjacent side of the bellows housing 12 as at 14. The other edge of the diaphragm 13 is secured by suitable retaining means to a plate-like member 16.

Extending through an opening in the plate-like member 16 and suitable bushings 17 and 18 mounted adjacent opposite sides of the bellows housing 12, as shown in FIG. 1, is an actuating rod 19. The rod 19 is secured to the plate-like member 16 by suitable means, such as by providing a lock nut 21 on the rod 19 at one side of the plate-like member 16. As shown in FIG. 1, the portion of the rod 19 adjacent the other side of the plate-like member 16 is larger in diameter than the portion thereof which passes through the plate-like member 16 whereby the plate-like member 16 moves with the rod 19. Mounted adjacent one end of the rod 19 is a piston 22 which moves axially within a cylinder 23 mounted at one side of the bellows housing 12, as shown in FIG. 1. Axial movement of the rod 19 is limited by a stop member 24 carried by the rod. A resilient cushion 26 surrounds the rod 19 adjacent the wall 12$^a$ of the bellows housing 12 in position to engage the stop member 24 to thereby cushion and limit axial movement of the rod 19. Also, a cushion member 27 is mounted adjacent the other end of the cylinder 23 in position to be engaged by the piston 22 as it reaches the outer limit of its travel. The cushion member 27 is held in place by a plate 28 and suitable securing means therefor indicated generally at 29.

Fluid under pressure, such as air, is introduced and exhausted from the cylinder 23 through a conduit 31 which in turn communicates with a three-way valve indicated generally at 32. Air is supplied to the three-way valve 32 by a supply conduit 33 and air is exhausted through a conduit 34. The three-way valve 32 is provided with a port 36 which extends directly across the rotatable element of the valve and a branch port 37 which communicates with the port 36. In the position shown in FIG. 1, the branch port 37 communicates with the conduit 31 while the port 36 communicates with the exhaust 34. Accordingly, in this position, air is exhausted from the cylinder 23. When the rotary element of the valve 32 is moved to align the port 36 with the conduits 31 and 33, the port 37 is blocked off while the air is introduced directly through the valve to the cylinder 23. The three-way valve 32 is operatively connected to the armature 38 of an electrical solenoid 39 by a lever arm 41. The lever arm 41 is urged in a counterclockwise direction, as viewed in FIG. 1, by a tension spring 42 having one end thereof connected to the free end of the lever arm 41 and the other end thereof secured to a stationary member 43.

It will thus be seen that upon introducing air through the conduit 33, valve 32 and conduit 31 into the cylinder 23, the piston 22 together with the rod 19 are moved axially to thus move the plate 16 away from the adjacent wall of the bellows housing 12. As the plate 16 is thus moved, the flexible diaphragm 13 also moves toward the right as viewed in FIG. 1, whereby a partial vacuum is created within the bellows housing 12. Surrounding the rod 19 between the plate-like member 16 and the side wall 12$^b$ of the housing 12 is a conical spring 44 which is adapted to return the rod 19 to the position shown in FIG. 1 when air is exhausted from the cylinder 23. By providing a conical spring 44, the convolutions of the spring are so arranged that the entire spring will collapse within a minimum of space and at the same time a uniform pressure is applied by the spring while it is compressed.

The bellows housing 12 is provided with a passageway 46 which communicates with a cotton receiving housing 47. The cotton receiving housing 47 is separated from the bellows housing 12 by a plurality of elongated, laterally spaced partition members 48 which slope downwardly toward the bellows housing 12, as shown in FIG. 1. The elongated partition members 48 are secured at their upper and lower ends to suitable transverse support members 45 and are preferably in the form of bars approximately 0.1 of an inch in width, which is also substantially equal the distance between adjacent bars. The bars are spaced from each other a distance to permit the flow of air therebetween and at the same time restrain movement of the cotton therebetween. Accordingly, as the stream of air and cotton engages the downwardly inclined bars 48, the air is free to move inwardly of the bellows housing while the cotton tends to move axially of the bars and then is discharged in the cotton receiving housing 47. This sliding action of the cotton relative to the downwardly inclined bars 48 causes the bars to remain in a clean condition at all times. That is to say, the sliding action of the cotton relative to the bars cleans the bars without the necessity of having to disassemble the apparatus for cleaning the partition members 48.

Cotton is introduced into the cotton receiving housing 47 by a cotton conveyor tube 49 which in turn is connected to a suitable cotton pickup hose and nozzle, not shown, whereby upon creating a partial vacuum within the bellows housing 12, air and cotton is drawn inwardly of the cotton conveyor tube 49 into the cotton receiving housing 47 where the air is separated therefrom. Also communicating with the cotton receiving housing 47 is a cotton discharge passageway 51 for discharging cotton from the cotton receiving housing 47 when the valve 32 is in the exhaust position, shown in FIG. 1. That is, when the valve 32 is moved to the exhaust position, the conical spring 44 urges the rod 19, the plate-like member 16 and the piston 22 toward the left, as viewed in FIG. 1, thereby forcing air through the passageway 46 into the cotton receiving housing 47.

The cotton receiving housing 47 is separated from the cotton conveyor tube 49 by a check valve 52 which permits flow of air and cotton inwardly of the cotton receiving housing 47 only. That is, the cotton and air can only flow from the conveyor tube 49 into the cotton receiving housing 47 and cannot flow outwardly of the cotton receiving chamber into the tube 49. The check valve 52 is mounted on suitable hinges 53 and is urged toward closed position by a suitable tension spring 54.

The cotton discharge passageway 51 is separated from the cotton receiving housing 47 by a check valve 56 which permits the cotton to flow from the cotton receiving housing 47 into the cotton discharge passageway 51 but prevents flow of the cotton from the passageway 51 into the cotton receiving housing 47. The check valve 56 is mounted on a suitable hinge member 57 and is urged toward closed position by a tension spring 58, as shown in FIG. 2.

From the foregoing description, the operation of our improved pneumatic cotton harvester will be readily understood. The cotton discharge passageway 51 is connected to a suitable hose 60 whereby the cotton is transferred to a trailer wagon or overhead basket, not shown. Also, if desired, a suitable receptacle, such as a bag, may be positioned beneath the cotton discharge passageway 51 in position to receive the cotton discharged therefrom. The cotton is picked up by a suitable cotton pickup nozzle when the solenoid 39 is actuated through a suitable switch, not shown. The nozzle and switch element may be of the type shown and described in our above mentioned co-pending application. Upon energizing the solenoid 39, the arm 41 is moved in a clockwise direction, as viewed in FIG. 1, whereby the port 36 is aligned axially with the conduits 33 and 31 to thereby supply air to the cylinder 23. As air is introduced into the cylinder 23, the piston 22 moves the rod 19 together with the plate 16 toward the right, as viewed in FIG. 1, whereby a partial vacuum is created within the bellows housing. That is, as the plate-like member 16 moves toward the right, as viewed in FIG. 1, the diaphragm 13 also moves toward the right to thus create a partial vacuum within the bellows housing 12 and draw air inwardly through the passageway 46. As air is drawn inwardly between the downwardly inclined partition members 48, a partial vacuum is created within the cotton receiving housing 47, thereby overcoming the pressure exerted by the tension spring 54 whereby the check valve 52 is moved in a clockwise direction to the dotted line position, as viewed in FIG. 1, to thus permit free flow of air and cotton into the cotton receiving housing 47. Upon deenergizing the solenoid 39, the tension spring 42 returns the valve 32 to the position shown in FIG. 1, whereby the air is exhausted from the cylinder 23. The conical spring 44 then moves the piston 22, together with the plate 16 and the rod 19 to the left, as viewed in FIG. 1, whereby the diaphragm 13 returns to the position shown in FIG. 1. As the diaphragm 13 moves toward the left, as viewed in FIG. 1, the check valve 56 is forced in a counterclockwise direction to the dotted line position, whereby any cotton in the cotton receiving housing 47 is forced therefrom into the cotton discharge passageway 51. At the time the cotton is being discharged from the cotton receiving housing 47, the check valve 52 is closed as shown in FIG. 1, due to the pressure exerted by the spring 54 and the force of the air thereagainst as the diaphragm 13 is returned to the position shown in FIG. 1.

The movement of the piston 22, the plate-like member 16 and the diaphragm 13 is substantially instantaneous whereby the cotton is moved into and discharged from the cotton receiving housing 47 almost instantaneously. Accordingly, the apparatus will take care of the flow of cotton into and from the cotton receiving housing 47 regardless of the frequency that the solenoid 39 is actuated.

In FIG. 4 of the drawing, we show the air and cotton as being introduced into the cotton receiving housing $47^a$ adjacent the upper portion thereof by an inlet or conveyor conduit $49^a$. The cotton is discharged from the cotton receiving housing $47^a$ by a discharge passageway $51^a$. The cotton receiving housing $47^a$ is also in communication with the bellows housing 12 by a passageway $46^a$. Separating the cotton receiving housing $47^a$ from the bellows housing 12 are a plurality of downwardly sloping partition members $48^a$ which are substantially identical in construction to the partition members 48, the principal difference being that the partition members $48^a$ slope downwardly away from the bellows housing 12 whereby the cotton introduced through the conduit $49^a$ moves downwardly relative to the partition members $48^a$ to thereby maintain the same in a clean condition at all times. The discharge passageway 51a is separated from the cotton receiving chamber $47^a$ by a check valve $56^a$ whereby the cotton in the cotton receiving housing $47^a$ flows in a single direction into the discharge passageway $51^a$. There can be no flow of cotton from the discharge passageway $51^a$ into the cotton receiving housing $47^a$ due to the construction and arrangement of the check valve $56^a$, which is substantially identical in construction and operation to the check valve 56. The inlet conduit $49^a$ is separated from the cotton receiving housing $47^a$ by a check valve $52^a$ which permits the cotton and air to move only in a direction to enter the cotton receiving housing $47^a$. Accordingly, there can be no flow of cotton and air outwardly of the cotton receiving housing $47^a$ into the inlet conduit $49^a$. The construction and arrangement of the check valve $52^a$ is substantially the same as the construction and arrangement of the check valve 52.

In FIG. 5 of the drawing, we show a further modified form of our invention in which the cotton and air are introduced adjacent the bottom of the cotton receiving housing $47^b$ by an inlet conduit $49^b$. Cotton is discharged from the cotton receiving housing $47^b$ by a discharge passageway $51^b$. The cotton receiving housing $47^b$ communicates with the bellows housing 12 by a passageway $46^b$. Separating the bellows housing 12 from the cotton receiving housing $47^b$ are a plurality of downwardly inclined partition members $48^b$ whereby the incoming air and cotton move upwardly against the inclined partition members to thereby maintain the same in a clean condition at all times. The inlet conduit $49^b$ is separated from the cotton receiving housing $47^b$ by a check valve $52^b$ which permits the cotton and air to enter the cotton receiving housing $47^b$ only. That is, there can be no flow of cotton and air from the cotton receiving housing $47^b$ to the inlet conduit $49^b$ due to the construction and arrangement of the check valve 52$^b$, which is substantially identical to the operation of the check valves 52 and 52$^a$ described hereinabove. The cotton discharge passageway 51$^b$ is separated from the cotton receiving housing 47$^b$ by a check valve 56$^b$ which permits the cotton to flow only from the cotton receiving housing 47$^b$ to the cotton discharge passageway 51$^b$. Accordingly, there can be no flow of cotton from the cotton discharge passageway 51$^b$ into the cotton receiving housing 47$^b$ due to the construction and arrangement of the check valve 56$^b$. The construction and operation of check valve 56$^b$ is substantially identical to the construction and operation of the check valves 56 and 56$^a$ described hereinabove.

A cleanout passageway 59 is provided adjacent the bottom of the bellows housing 12, as shown in FIG. 1, whereby any foreign materials entering the bellows housing may be removed. A suitable closure member 61 is provided for the passageway 59 whereby the passageway 59 may be opened for the removal of trash and closed after the trash is removed. The closure member 61 forms an airtight seal when in the closed position whereby there is no loss of air at this point.

From the foregoing, it will be seen that we have devised an improved apparatus for harvesting cotton. By providing inclined partition members in the cotton receiving housing which separate the air from the cotton, the cotton engages and moves relative to the inclined members whereby there is no accumulation of foreign materials, such as motes within the passageways between the inclined bars. Also, by providing a conical compression spring for returning the diaphragm of the bellows and the piston to the original or exhaust position, there is a uniform flow of air through the partition members as the cotton is exhausted from the cotton receiving housing, thereby further assuring smooth operation of our improved apparatus.

While we have shown our invention in several forms, it will be obvious to those skilled in the art that it is not so limited but is susceptible of various other changes and modifications without departing from the spirit thereof, and we desire, therefore, that only such limitations shall be placed thereupon as are specifically set forth in the appended claims.

What we claim is:
1. In a cotton harvester,
   (a) a cotton conveyor tube,
   (b) a cotton receiving housing having an inlet in communication with the discharge end of said cotton conveyor tube, said receiving housing being provided with a cotton discharge passageway,
   (c) a bellows housing in communication with said receiving housing,
   (d) a plurality of elongated, laterally spaced partition members separating said receiving housing from said bellows housing and inclined relative to the direction of movement of the air and cotton, said partition members being generally parallel to each other and spaced from each other a distance to permit the flow of air therebetween and restrain the movement of cotton therebetween,
   (e) a movable diaphragm mounted in said bellows housing whereby upon movement of said diaphragm in one direction air is drawn from said receiving housing through said partition members into said bellows housing and upon movement of the diaphragm in the other direction air is forced from said bellows housing into said receiving housing,
   (f) a check valve separating said conveyor tube from said receiving housing and permitting flow of air and cotton inwardly of said receiving housing only,
   (g) a check valve mounted in position to permit flow of air and cotton outwardly of the discharge passageway of said receiving housing only, and
   (h) quick acting means to move said diaphragm intermittently in said one direction and then in said other direction whereby cotton is drawn into said receiving housing in response to movement of said diaphragm in said one direction and cotton is forced out of said receiving housing in response to movement of said diaphragm in said other direction.

2. A cotton harvester as defined in claim 1 in which the elongated, laterally spaced partition members comprise a plurality of laterally spaced, parallel bars attached at their upper and lower ends to transverse support members.

3. A cotton harvester as defined in claim 1 in which each of the elongated, laterally spaced partition members are approximately equal in width to the distance between adjacent partition members.

4. A cotton harvester as defined in claim 1 in which each of the elongated laterally spaced partition members are approximately 0.1 inch in width.

5. A cotton harvester as defined in claim 1 in which the cotton discharge passageway is provided between the inlet for said cotton receiving chamber and the laterally spaced partition members.

6. A cotton harvester as defined in claim 1 in which the inlet for said cotton receiving housing is provided between said cotton discharge passageway and said laterally spaced partition members.

7. A cotton harvester as defined in claim 6 in which said inlet is provided in the upper portion of said cotton receiving housing.

8. A cotton harvester as defined in claim 6 in which said inlet is provided in the lower portion of said cotton receiving housing.

9. A cotton harvester as defined in claim 1 in which said bellows housing is provided with a clean out passageway adjacent the lower portion thereof.

References Cited in the file of this patent

UNITED STATES PATENTS

| | | |
|---|---|---|
| Re. 16.055 | Schofield | Apr. 82, 1925 |
| 2,785,522 | McKenzie | Mar. 19, 1957 |
| 3,058,282 | Ganguet et al. | Oct. 16, 1962 |